United States Patent
December et al.

(10) Patent No.: US 6,512,048 B1
(45) Date of Patent: *Jan. 28, 2003

(54) CATHODIC ELECTROCOAT HAVING A CARBAMATE FUNCTIONAL RESIN

(75) Inventors: Timothy S. December, Rochester, MI (US); Walter H Ohrbom, Hartland Township, MI (US); Gregory G. Menovcik, Farmington Hills, MI (US)

(73) Assignee: BASF Corporation, Southfield, MI (US)

(*) Notice: Subject to any disclaimer, the term of this patent is extended or adjusted under 35 U.S.C. 154(b) by 92 days.

This patent is subject to a terminal disclaimer.

(21) Appl. No.: 09/699,130

(22) Filed: Oct. 26, 2000

Related U.S. Application Data

(62) Division of application No. 09/217,917, filed on Dec. 21, 1998, now Pat. No. 6,165,338.

(51) Int. Cl.[7] .................. C09D 133/14; C09D 163/00; C25D 13/04
(52) U.S. Cl. .................. 525/163; 525/123; 525/142; 525/157; 525/328.2; 525/528; 204/500; 204/506
(58) Field of Search .................. 204/506, 499, 204/500; 525/163, 123, 142, 157, 328.2, 528

(56) References Cited

U.S. PATENT DOCUMENTS 6,048,433 A * 4/2000 December et al. .......... 204/506
6,165,338 A * 12/2000 December et al. .......... 204/506
6,303,690 B1 * 10/2001 December et al. .......... 525/163

* cited by examiner

Primary Examiner—Nathan M. Nutter
Assistant Examiner—Thao Tran
(74) Attorney, Agent, or Firm—Mary E. Golota

(57) ABSTRACT

The invention provides a polymer (a) having a polymer backbone having appended thereto at least one carbamate functional group, the polymer represented by randomly repeating units according to the formula:

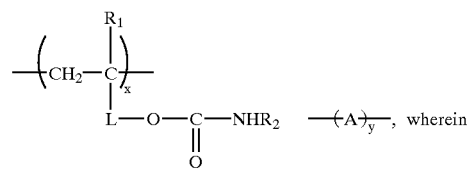

$R_1$ represents H or $CH_3$, $R_2$ represents H, alkyl, or cycloalkyl, L represents a divalent linking group, A represents repeat units comprising at least one repeat unit having a pendant cationic salting group, x represents 10 to 90 weight %, and y represents 90 to 10 weight %. The invention further provides a cathodic electrocoat coating composition comprising an aqueous dispersion of a polymer (a) and (b) a compound having a plurality of functional groups that are reactive with said carbamate groups, wherein the repeat units A of polymer (a) having a pendant cationic salting group are salted with an acid.

17 Claims, No Drawings

CATHODIC ELECTROCOAT HAVING A CARBAMATE FUNCTIONAL RESIN

This is a divisional application of prior application Ser. No. 09/217,917 filed on Dec. 21, 1998, now U.S. Pat. No. 6,165,338.

FIELD OF THE INVENTION

The present invention relates to coating compositions for use in cathodic electrodeposition coating processes and methods of cathodic electrodeposition. More particularly, the invention provides cathodic electrocoat compositions having a carbamate functional resin. The invention also provides methods of cathodically electrodepositing a coating on a substrate using the coating compositions of the invention.

BACKGROUND OF THE INVENTION

Coating compositions are widely in use today which utilize a variety of cure mechanisms. Among these are anodic and cathodic electrodeposition coating compositions and methods.

During electrodeposition, an ionically-charged polymer having a relatively low molecular weight is deposited onto a conductive substrate by submerging the substrate in an electrocoat bath having dispersed therein the charged resin, and applying an electrical potential between the substrate and a pole of opposite charge, usually a stainless steel electrode. This produces a relatively soft coating of low molecular weight on the substrate. This coating is usually converted to a hard high molecular weight coating by curing or crosslinking of the resin.

One curing mechanism utilizes a melamine formaldehyde polymer-curing agent in the electrodepositable coating composition to react with hydroxyl functional groups on the electrodeposited resin. This curing method provides good cure at relatively low temperatures (e.g., 132° C.), but the crosslinked bonds contain undesirable ether linkages and the resulting coatings provide poor overall corrosion resistance.

In order to address some of the problems with melamine-crosslinked electrocoats, many users employ polyisocyanate crosslinkers to react with hydroxyl functional groups on the electrodeposited resin. This curing method provides desirable urethane crosslink bonds, but it also entails several disadvantages. In order to prevent premature gelation of the electrodepositable coating composition, the highly reactive isocyanate groups on the curing agent must be blocked (e.g., with an oxime, lactam, or alcohol).

Blocked polyisocyanates, however, require high temperatures (e.g., 176° C. or more) to unblock and begin the curing reaction. The resulting electrocoats can also be susceptible to yellowing. Moreover, the volatile blocking agents released during cure can cause other deleterious effects on various coating properties, as well as increasing VOC. In addition, use of some the volatile blocking agents may give rise to environmental concerns. Finally, the volatile blocking agents account for significant and disadvantageous weight loss upon crosslinking.

There is thus a need in the art for electrodepositable coating compositions that can provide desirable urethane crosslink linkages, but avoid the problems that accompany the use of blocked polyisocyanate curing agents. In particular, it is desireable to provide a cathodic electrodeposition coating composition capable of providing urethane linkages at low bake temperatures of 121° C. or less with decreased weight loss upon crosslinking, while being free of isocyanates and the volatile blocking agents used with isocyanates.

SUMMARY OF THE INVENTION

The foregoing objects are achieved with a polymer having a polymer backbone having appended thereto at least one carbamate functional group, the polymer represented by randomly repeating units according to the formula:

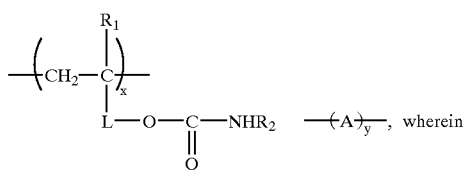

$R_1$ represents H or $CH_3$, $R_2$ represents H, alkyl, or cycloalkyl, L represents a divalent linking group, A represents repeat units comprising at least one repeat unit having a pendant cationic salting group, x represents 10 to 90 weight %, and y represents 90 to 10 weight %.

The invention further provides a cathodic electrocoat coating composition comprising an aqueous dispersion of a polymer (a) comprising a polymer backbone having appended thereto at least one carbamate functional group, said polymer (a) represented by randomly repeating units according to the formula:

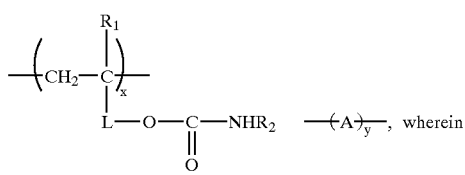

$R_1$ represents H or $CH_3$, $R_2$ represents H, alkyl, or cycloalkyl, L represents a divalent linking group, A represents repeat units comprising at least one repeat unit having a pendant cationic salting group, x represents 10 to 90 weight %, y represents 90 to 10 weight %, and (b) a compound having a plurality of functional groups that are reactive with said carbamate groups, wherein the repeat units A having a pendant cationic salting group are reacted with an acid.

Finally, the invention provides a cathodic electrodeposition method requiring 1) immersing a conductive substrate in a coating composition comprising, in an aqueous medium: (a) a polymer backbone having appended thereto at least one carbamate functional group, said polymer represented by randomly repeating units according to the formula:

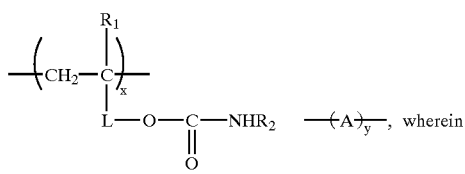

$R_1$ represents H or $CH_3$, $R_2$ represents H, alkyl, or cycloalkyl, L represents a divalent linking group, A comprises repeat units comprising at least one repeat unit having a pendant cationic salting group which is reacted with an acid, x represents 10 to 90 weight %, and y represents 90 to 10 weight %, and (b) a compound having a plurality of functional groups that are reactive with said carbamate groups, 2) applying a voltage between an anode and the conductive substrate, and 3) removing the substrate from the coating composition.

DETAILED DESCRIPTION OF THE INVENTION

The polymer (a) of the invention will have at least one carbamate functional group appended to a polymer backbone, preferably a plurality of pendant carbamate functional groups. It is preferred, but not necessary, that the polymer backbone to which the carbamate functional group is appended be an acrylic polymer.

Polymer (a) of the invention can be prepared in a variety of ways.

One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an $\alpha,\beta$-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art. In a preferred embodiment, at least one of the ethylenically unsaturated monomers will have a pendant cationic salting group.

As used herein, the term "cationic salting site" refers to a functional group which is sufficiently basic to undergo reaction with an acid to produce a salt, which, while in an aqueous dispersion in the presence of a voltage, will undergo decomposition and facilitate the formation of a insoluble polymer which deposits on a substrate immersed in the aqueous dispersion. Preferred cationic salting groups are amine functional groups and quaternary ammonium salts. The amine functional groups of the polymer (a) may be primary, secondary, tertiary amino groups or quaternary ammonium salts. Quaternary ammonium salts and tertiary amines are most preferred, with tertiary amine groups especially preferred. Such groups may also be part of polyamines and/or alkanol amines.

The cationic salting site can be incorporated into or grafted to the polymer backbone in a variety of ways.

For example, a carbamate functional acrylic monomer can be copolymerized with an ethylenically unsaturated monomer having at least one cationic salting group. The cationic salting group may be a primary, secondary, or tertiary amine functional group, or a quaternary ammonium salt, or a mixture thereof. Illustrative examples of such monomers are methacrylamide, acrylamide, dimethylaminoethyl methyacrylate, mixtures thereof, and the like. Another example of a suitable ethylenically unsaturated monomer having amino functionality is the reaction product of glycidyl methacrylate and a tertiary amine salt. Dimethylaminoethyl methacrylate is most preferred.

Alternatively, as will be discussed below, a polymer having oxirane or glycidyl functionality can be made and the cationic salting group formed by reaction of the glycidyl group with an amine or a polyamine. Amines or polyamines may be used having primary, secondary, or tertiary amine groups. Tertiary amine salts may be used to form quaternary ammonium salts via reaction with the glycidyl group on the polymer backbone and are preferred.

Finally, a monomer such as glycidyl methacrylate can be polymerized with a ethylenically unsaturated carbamate functional monomer to produce an carbamate functional acrylic having pendent glycidyl functionality. A cationic salting site can be incorporated by reaction of an amine functional compound, polyamine, or tertiary amine salt with the oxirane group.

Preferred methods of preparing the polymer (a) of the invention having an acrylic backbone include the following.

One or more carbamate functional monomers such as 2-carbamate ethyl methyacrylate (CEMA) may be copolymerized with at least one ethylenically unsaturated amine functional compound, at least one alkyl ester of an unsaturated organic acid and at least one other ethylenically unsaturated monomer such as styrene in the presence of a suitable initiator such as an azo or peroxide initiator. Other suitable carbamate functional monomers include those discussed above. Illustrative suitable unsaturated amine functional compounds are as discussed above. A preferred unsaturated amine functional compound is dimethylaminoethyl methyacrylate. Examples of suitable alkyl esters of unsaturated organic acid include ethyl acrylate, butyl acrylate, 2-ethylhexyl acrylate, butyl methyacrylate, isodecyl methyacrylate, hydroxyethyl methacrylate, hydroxypropyl methacrylate, and the like. Preferred alkyl esters are nonhydroxy functional monomers such as butyl acrylate and butylmethacrylate. A preferred monomer for use as an additional ethylenically unsaturated monomer is styrene.

In another reaction scheme, an adduct may be made from a polyisocyanate such as isophorone diisocyanate (IPDI) or toluene diisocyanate (TDI) and a hydroxy functional carbamate compound such as hydroxypropyl carbamate. The resulting adduct can then be grafted onto an acrylic, epoxy or other hydroxy functional resin having suitable characteristics for use.

Another method involves a multistep reaction wherein a hydroxy carbonate may reacted with ammonia or an amine functional compound to provide a primary, secondary or tertiary carbamate functional compound. This compound is then reacted with an anhydride compound via the reaction of the hydroxy group with the anhydride ring. The carboxylic acid groups of the resulting reaction product are then reacted with the oxirane groups of a glycidyl ether of Bisphenol A. Cationic salting groups are incorporated via the reaction of an amine functional compound, such as diethanol amine, with the glycidyl ether groups which terminate the resulting hydroxy and carbamate functional polymer.

In an alternative reaction, an isocyanate functional monomer such as unsaturated m-tetramethyl xylene isocyanate (sold by American Cyanamid as TMI®) can be copolymerized with monomers such as alkyl esters as described immediately above such as butyl acrylate and unsaturated monomers such as styrene to produce an isocyanate functional polymer. The required cationic salting group functionality and carbamate functionality can then be grafted onto the isocyanate functional polymer by a multi-stage reaction having a first stage using a carbamate functional monomer such as hydroxypropyl carbamate followed by a second stage using an amine functional compound, i.e., primary, secondary or tertiary amine groups, most preferably an alkanol amine.

A most preferred method of making the polymer (a) of the invention involves the copolymerization of at least one carbamate functional monomer, at least one unsaturated amine functional compound, at least one additional ethylenically unsaturated monomer, and at least one alkyl ester of an unsaturated organic acid. A most preferred reaction scheme involves the copolymerization of CEMA, dimethylaminoethyl methacrylate, styrene, and butyl acrylate in the presence of an azo or peroxide initiator.

The polymer component (a) can be represented by the randomly repeating units according to the following formula:

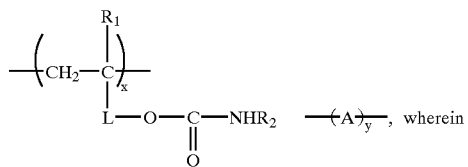

In the above formula, $R_1$ represents H or $CH_3$. R2 represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers, at least one of which repeat units must have a pendent cationic salting group, preferably an amino group. As discussed above, the at least one cationic salting group may derive from the use of at least one ethylenically unsaturated monomer having at least one amino group. Alternatively, the at least one repeating unit having a pendent cationic salting site may derive from the reaction of an amine functional compound with a glycidyl group previously incorporated into the polymer.

Other monomers which may be utilized to provide repeating units (A) not having pendent amino functionality are those monomers for copolymerization with acrylic monomers known in the art. These include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

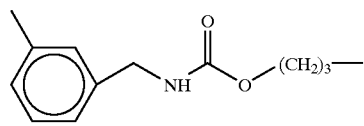

—$(CH_2)$—, —$(CH_2)_2$—, —$(CH_2)_4$—, and the like. In one preferred embodiment, —L— is represented by —COO—L'— where L' is a divalent linking group. Thus, in a preferred embodiment of the invention, the polymer component (a) is represented by randomly repeating units according to the following formula:

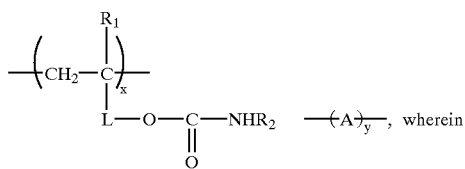

In this formula, $R_1$, $R_2$, A, x, and y are as defined above. L' may be a divalent aliphatic linking group, preferably of 1 to 8 carbon atoms, e.g., —$(CH_2)$—, —$(CH_2)_2$—, —$(CH_2)_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group. Of course, A would still require the necessary pendent amino groups or quaternary ammonium salt as discussed above.

The polymer (a) will generally have a weight average molecular weight of 2000–100,000, and preferably from 10,000–60,000. Molecular weight can be determined by the GPC method using a polystyrene standard.

The glass transition temperature, $T_g$, of components (a) and (b) can be adjusted to achieve a cured coating having the $T_g$ for the particular application involved. The average $T_g$ of unreacted components (a) and (b) should be between 0° C. and 100° C., with the individual $T_g$'s being adjusted to achieve optimum performance.

Polymer (a) may be further characterized by a meq of cationic salting group, preferably an amine group, of from about 0.5 to 2.0 meq N/gram polymer (a), preferably from about 0.8 to 1.5 meq N/gram polymer (a), and most preferably from about 1.0 to 1.2 meq N/gram polymer (a).

Polymer (a) should also have a carbamate equivalent weight (grams of polymer (a)/equivalent of carbamate) of from 150 to 1200, preferably from 200 to 600, and most preferably from 300 to 400.

It will appreciated that the various monomers and/or reactants used to make polymer (a) will be used in amounts necessary to obtain the meq N, Tg, weight average molecular weight and carbamate equivalent weight.

The cathodic coating composition of the invention also comprises a curing agent (b). Curing agent (b) is a compound having a plurality of functional groups that are reactive with the carbamate groups on component (a). Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups. Examples of (b) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), benzoguanamine resins, glycol uril formaldehyde resins, polyanhydrides (e.g., polysuccinic anhydride), and polysiloxanes (e.g., trimethoxy siloxane). Aminoplast resin such as melamine formaldehyde resin or urea formaldehyde resin are especially preferred.

Polymer (a) when reacted with an acid is water-dispersible and is useful in electrodeposition processes, especially when incorporated into an emulsion or dispersion. The aqueous dispersion of polymer (a) should be neutralized to a degree sufficient to (i) form an emulsion micelle of less than 0.50 $\mu$M, preferably less than 0.20 $\mu$M, and (ii) provide emulsion stability in the electrocoat deposition bath.

Electrodepositable coating compositions are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.05 to 5.0 microns, preferably less than 2.0 microns.

The concentration of the polymer (a) in the aqueous medium is, in general, not critical, but ordinarily the major portion of the aqueous dispersion is water. The aqueous dispersion usually contains from about 3 to 50 percent, preferably 10 to 40 percent by weight resin solids. Aqueous resin concentrates which are to be further diluted with water, generally range from 10 to 30 percent by total weight solids.

Polymer (a) is preferably reacted with an acid for use in the cathodic electrocoat coating composition of the invention. This reaction may be termed "neutralization or "acid-salted" and specifically refers to the reaction of the pendent amino groups with an acidic compound in an amount sufficient to neutralize enough of the basic amino groups to impart water-dispersibility to polymer (a). Illustrative acid compounds include phosphoric acid, propionic acid, acetic acid, lactic acid, or citric acid.

The coating composition of the invention can further contain catalysts to facilitate the reaction between polymer (a) and curing agent (b). For example, a strong acid catalyst may be utilized to enhance the cure reaction. It will be appreciated that such catalysts may be blocked or unblocked. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts useful in the composition of the invention include Lewis acids, zinc salts, and tin salts. Illustrative Lewis acids or zinc salts are zinc nitrate, zinc acetate, bismuth octoate, dibutyltin dilaurate, and the like. Such catalysts will typically be used in an amount of from 0.1 to 3.0 weight percent, based on the resin solids, preferably from 0.5 to 2.0 weight percent, based on the resin solids. A most preferred catalyst for use in the coating composition of the invention is zinc nitrate.

Besides water, the aqueous medium of an electrocoat composition may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene, ethylene glycol butyl ether, ethyleneglycol dimethyl ether, or mixtures thereof. A small amount of a water-immiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

Electrodeposition coating compositions may further contain conventional pigments such as titanium dioxide, ferric oxide, carbon black, aluminum silicate, precipitated barium sulfate, aluminum phosphomolybdate, strontium chromate, basic lead silicate or lead chromate. The pigment-to-resin weight ratio can be important and should be preferably less than 50:100, more preferably less than 40:100, and usually about 10 to 30:100. Higher pigment-to-resin solids weight ratios have also been found to adversely affect coalescence, flow, and/or coating performance.

Electrodeposition coating compositions can contain optional ingredients such as wetting agents, surfactants, defoamers, antioxidants, UV absorbers, light stabilizers, and so forth. Examples of surfactants and wetting agents include alkyl imidazolines such as those available from Ciba-Geigy Industrial Chemicals as Amine C®, acetylenic alcohols available from Air Products and Chemicals as Surfynol® 104. These optional ingredients, when present, constitute from about 0 to 20 percent by weight of resin solids, and preferably from 0.1 to 1.0 percent by weight of resin solids. Plasticizers are optional ingredients because they promote flow. Examples are high boiling water immiscible materials such as polyalkylene polyols, such as polypropylene polyols or ethylene or propylene oxide adducts of nonyl phenols or bisphenol A. Plasticizers can be used and if so are usually used at levels of about 0 to 15 percent by weight resin solids.

In general, sufficient water is added so that the dispersion has a solids content of more than 20, preferably more than 30% by weight.

The electrodeposition coating composition should have an electroconductivity from 0.1 to 5 mS/cm, preferably from 0.5 to 3 mS/cm. When this value is too low, it is difficult to obtain a film thickness having desired protective and other functions. Conversely, if the composition is too conductive, problems such as the dissolution of substrate or counter electrode in the bath, uneven film thickness or poor water or corrosion resistance may arise.

Electrodeposition coating compositions may be applied on a conductive substrate by the electrodeposition coating process at a nonvolatile content of 10 to 25% by weight to a dry film thickness of 15 to 35 microns. After application, the coating may be cured at an elevated temperature, depending upon the nature of particular base resins. Prior art cathodic electrodeposition coating typically cure at approximately 20 minutes at 350° F. (metal temperature). The cathodic electrodeposition coating compositions of the invention cure at 20 minutes at 310° F. or less (metal temperature), preferably at 20 minutes at 200° F. (metal temperature).

The cathodic electrodeposition coatings of the invention are advantageous in that % weight loss upon crosslinking is less than 15%, preferably less than 10% and most preferably from 6 to 8%, based on the total weight of applied coating.

It will be appreciated that the method of cathodic deposition of the invention may further comprise rinsing and baking the coated substrate after removal from the coating composition bath.

Electrodeposition of the coating preparations according to the invention may be carried out by any of a number of processes known to those skilled in the art. The deposition may be carried out on all electrically conducting substrates, for example metal, such as steel, copper, aluminum and the like.

In a preferred embodiment, the cathodic electrodeposition method of the invention will be used to provide a first layer of electrodeposited coating on a metallic substrate.

A pigmented resin coating and optionally a clearcoat layer may be applied over primer layers, including electrocoat primer layers. In automotive applications, the pigmented resin layer is often called a basecoat or pigmented basecoat. The resin in the pigmented resin layer can be of a number of resins known in the art. For example, the resin can be an acrylic, a polyurethane, or a polyester. Typical pigmented resin coating formulations are described in U.S. Pat. Nos. 4,791,168, 4,414,357, and 4,546,046, the disclosures of which are incorporated herein by reference. In one preferred embodiment, the resin is an ε-caprolactone-modified acrylic resin, as described in U.S. Pat. No. 4,720,528, the disclosure of which is incorporated herein by reference. The pigmented resin can be cured by any of the known mechanisms and curing agents, such as a melamine polyol reaction (e.g., melamine cure of a hydroxy-functional acrylic resin).

Other pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

After an article is coated with the above-described layers, the composition is subjected to conditions so as to cure the coating layers. Although various methods of curing may be used, including curing at ambient conditions, heat-curing is preferred because it has added benefits, such as driving off residual water or solvent from the coating composition. Generally, heat curing is effected by exposing the coated article to elevated temperatures provided primarily by radiative heat sources. Curing temperatures will vary depending on the particular blocking groups used in the cross-linking agents, however they generally range between 90° C. and 200° C., preferably between 121 ° C. and 162° C., and most preferably between 121° C. and 141° C. The curing time will vary depending on the particular components used, and physical parameters such as the thickness of the layers, however, typical curing times range from 15 to 60 minutes.

The invention is further described in the following examples.

EXAMPLE 1

Preparation of a Polymer (a) According to the Invention 41.8 grams propylene glycol methyl ether (PM) and 7.0 grams acetone were added to a 500 ml flask equipped with a mixer, condenser and temperature probe. The solvent blend was heated to reflux (ca. 98° C.). The following monomers were added to a separate flask: 128.6 g of carbamate ethyl methacrylate (CEMA) @ 70% in PM, 32.0 g dimethylaminoethylmethacrylate (DMAEMA) and 78.0 g butylacrylate (BA). 3.3 g 2,2'Azobis-(2-methylbutyronitrile) (VAZO 67) dissolved in 6.5 g acetone was added to the monomer mixture. The resulting monomer mixture was added to the 500 ml reaction flask over 2 hours while maintaining the temperature between 96° C. and 102° C. The reaction was held for 1.25 hours at 96–102° C. 0.9 g of the VAZO 67 initiator in 0.9 g acetone was added to the reaction flask. The was held for 1.25 hours at 96–102° C. The resulting product had a number average molecular weight of 25,000 (by GPC) at 69% solids. The theo. Tg was 9° C. The carbamate equivalent weight of the polymer was 384 g polymer NV/eq carbamate functionality. The meq Base of the polymer was 1.02 grams polymer (a)/N salting site.

EXAMPLE 2

Preparation of a Cathodic Emulsion According to the Invention 110.0 g of the polymer (a) from Example 1, 37.0 g melamine (Cymel 1156 from Cytec), and 7.0 g of plasticizer (Synfac 8009 from Milliken Chemical) were added to a quart vessel and mixed until homogeneous. 21.0 g zinc nitrate (20% solution) and 4.4 g 88% lactic acid were added and mixed until homogeneous. A total of 532.6 g deionized water was added in portions with good mixing. The resulting emulsion had a solids content of 18%. The pH was 6.18 and the conductivity was 1546 microohms. The emulsion had a particle size of 0.46 microns. The meq acid was 0.33 and the meq base was 0.594 for a neutralization of 55%.

EXAMPLE 3

Preparation of a Pigment Grind Paste

Part A

To a 12 l flask, the following materials were added: 2125 grams of the diglycidylether of bisphenol A, 644 grams of bisphenol A, 370 grams of dodecylphenol and 162 grams of xylene. The mixture was heated to 1250° C., and 3.1 grams of triphenylphosphine were added. The reation temperature was increased to 130° C. and maintained for 3 hours. The reaction was cooled by the addition of 795 grams ethylene glycol monobutyl ether and 1907 grams of propyleneglycol glycidyl ether. The remaining epoxy was capped by the addition of 218 grams of 2-aminoethoxyethanol and 173 grams of dime-thyaminopropylamine. The temperature was maintained at 110° C. for 4 hours. The temperature was then decreased to 70° C. and 164 grams acetic acid, and 1439 grams of deionized water were added. In a separate vessel, the resulting resin was diluted with 6000 grams of deionized water.

Part B

To an appropriate vessel, the following were added: 10,700 grams of the resin from Part A above, 325 grams carbon black, 542 grams dibutyltin oxide, 379 grams lead silicate, 1625 grams clay, 8504 grams titanium dioxide, and 2574 grams deionized water. These ingredients were mixed under a high shear and then milled. The paste was then diluted with 2000 grams of deionized water.

EXAMPLE 4

Preparation of a Cathodic Electrocoat Bath

To a quart vessel were added 702 grams of the emulsion from Example 2 and 45.3 grams of the grey Pb free pigment paste from Part B of Example 3. The bath had a pigment binder ratio of 0.2 and a solids content of 19%. The bath was mixed for 2 hours in an open vessel. The bath had a pH of 6.1 and a conductivity of 1800 micromhos.

EXAMPLE 5

Deposition of Cathodic Electrocoat Coating Composition.

Using a Dc rectifier, a 2"×3" steel panel was coated with the cathodic bath of Example 4 via cathodic electrodeposition. The set voltage was 50–100 volts and 0.5 amps for 2.2 minutes. The bath temperature was 70° F.

One set of panels was baked at 30' at 310° F. and a second set baked at 30' at 350° F., all in a gas oven. The cured films had a good smooth, continuous appearance with a film build of 0.8 mil. The solvent resistance was good and passed 100 MEK rubs.

We claim:

1. A polymer composition comprising:
   a polymer (a) having a polymer backbone having appended thereto at least one carbamate functional group, said polymer represented by randomly repeating units according to the formula:

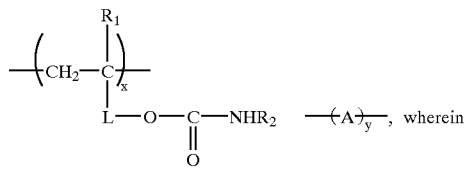

$R_1$ represents H or $CH_3$,
   $R_2$ represents H, alkyl, or cycloalkyl,
   L represents a divalent linking group,
   A represents repeat units comprising at least one repeat unit having a pendent cationic salting site,
   x represents 10 to 90 weight %, and
   y represents 90 to 10 weight %.

2. The polymer composition of claim 1 wherein the cationic salting site comprises an amine functional group.

3. The polymer composition of claim 1 wherein A comprises repeat units having a cationic salting site which are derived from at least one ethylenically unsaturated monomer having a cationic salting site.

4. The polymer composition of claim 1, wherein the pendent cationic salting sites of repeat units A are salted with an acid.

5. The polymer composition of claim 2 wherein the pendent cationic salting sites are a tertiary amine group.

6. The polymer composition of claim 5 wherein the tertiary amine group is dimethylaminoethyl.

7. The polymer composition of claim 1 having a number average molecular weight of from about 2000 to 100,000.

8. The polymer composition of claim 7 having a number average molecular weight of from about 10,000 to 60,000.

9. The polymer composition of claim 1 having a meq range of from 0.5 to 2.0.

10. The polymer composition of claim 9 having a meq range of from 0.8 to 1.5.

11. A cathodic electrocoat coating composition comprising an aqueous dispersion of
    (a) a polymer comprising a polymer backbone having appended thereto at least one carbamate functional group, said first component represented by randomly repeating units according to the formula:

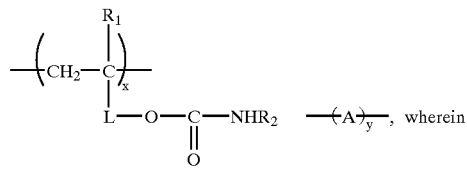

$R_1$ represents H or $CH_3$,
   $R_2$ represents H, alkyl, or cycloalkyl,
   L represents a divalent linking group,
   A represents repeat units comprising at least one repeat unit having a pendent cationic salting site,
   x represents 10 to 90 weight %, and
   y represents 90 to 10 weight %, and
    (b) a compound having a plurality of functional groups that are reactive with said carbamate groups,
    wherein the repeat units A having a pendant cationic salting site are reacted with an acid.

12. The cathodic electrocoat coating composition of claim 11 wherein A further comprises repeat units derived from one or more ethylenically unsaturated monomers.

13. The cathodic electrocoat coating composition of claim 11 wherein A comprises repeat units having a pendent cationic salting site which are derived from at least one ethylenically unsaturated monomer having a pendent cationic salting site.

14. The cathodic electrocoat coating composition of claim 11 wherein the pendent cationic salting sites are salted with an acid.

15. The cathodic electrocoat coating composition of claim 14 wherein the cationic salting site is a tertiary amine.

16. The anodic electrocoat coating composition of claim 11 wherein polymer (a) has a number average molecular weight of from about 10,000 to 60,000.

17. The anodic electrocoat coating composition of claim 11 wherein polymer (a) has a meq value of from 0.5 to 2.0.

* * * * *